United States Patent [19]

Denman

[11] 4,164,379
[45] Aug. 14, 1979

[54] OFFSHORE PIPE LAYING
[76] Inventor: Lee R. Denman, P.O. Box 52891, Houston, Tex. 77052
[21] Appl. No.: 851,193
[22] Filed: Nov. 14, 1977
[30] Foreign Application Priority Data
Nov. 15, 1976 [GB] United Kingdom ............... 47582/76
[51] Int. Cl.² .............................................. F16L 1/00
[52] U.S. Cl. ..................................... 405/158; 340/3 T
[58] Field of Search ................. 61/107; 340/108, 106, 340/109, 113, 3 T, 6 R; 114/144; 405/158

[56] References Cited
U.S. PATENT DOCUMENTS 3,105,453  10/1963  Hayes ................................... 114/144
3,902,155  8/1975   Young .................................. 340/3 T
3,962,726  6/1976   Watts ................................... 340/3 T
4,037,189  7/1977   Bell et al. ............................ 340/6 R Primary Examiner—Jacob Shapiro
Attorney, Agent, or Firm—LeBlanc & Shur

[57] ABSTRACT

An offshore pipe laying system and method employs a remotely controllable submersible to track along the pipe line as laid on the sea bed. A sonic location device on the submersible enables the position of the touch down point of the pipe being laid to be determined. The deviation of this position from the intended track of the pipeline is computed and the pipe laying vessel is controlled to reduce this deviation.

10 Claims, 5 Drawing Figures

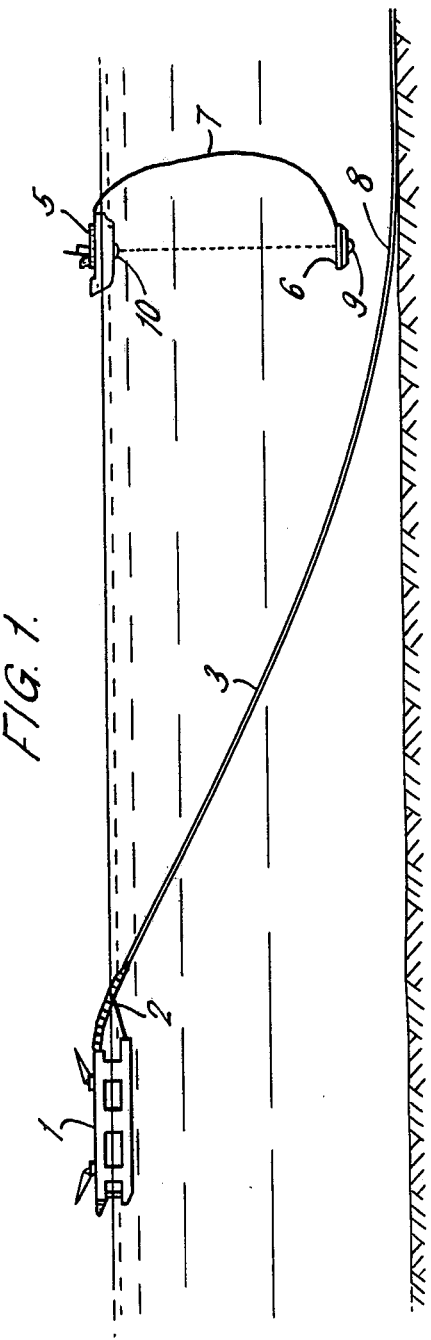
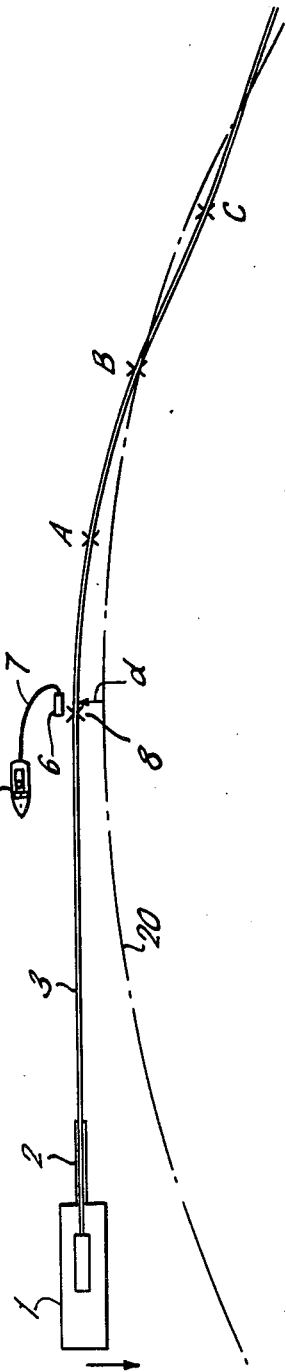

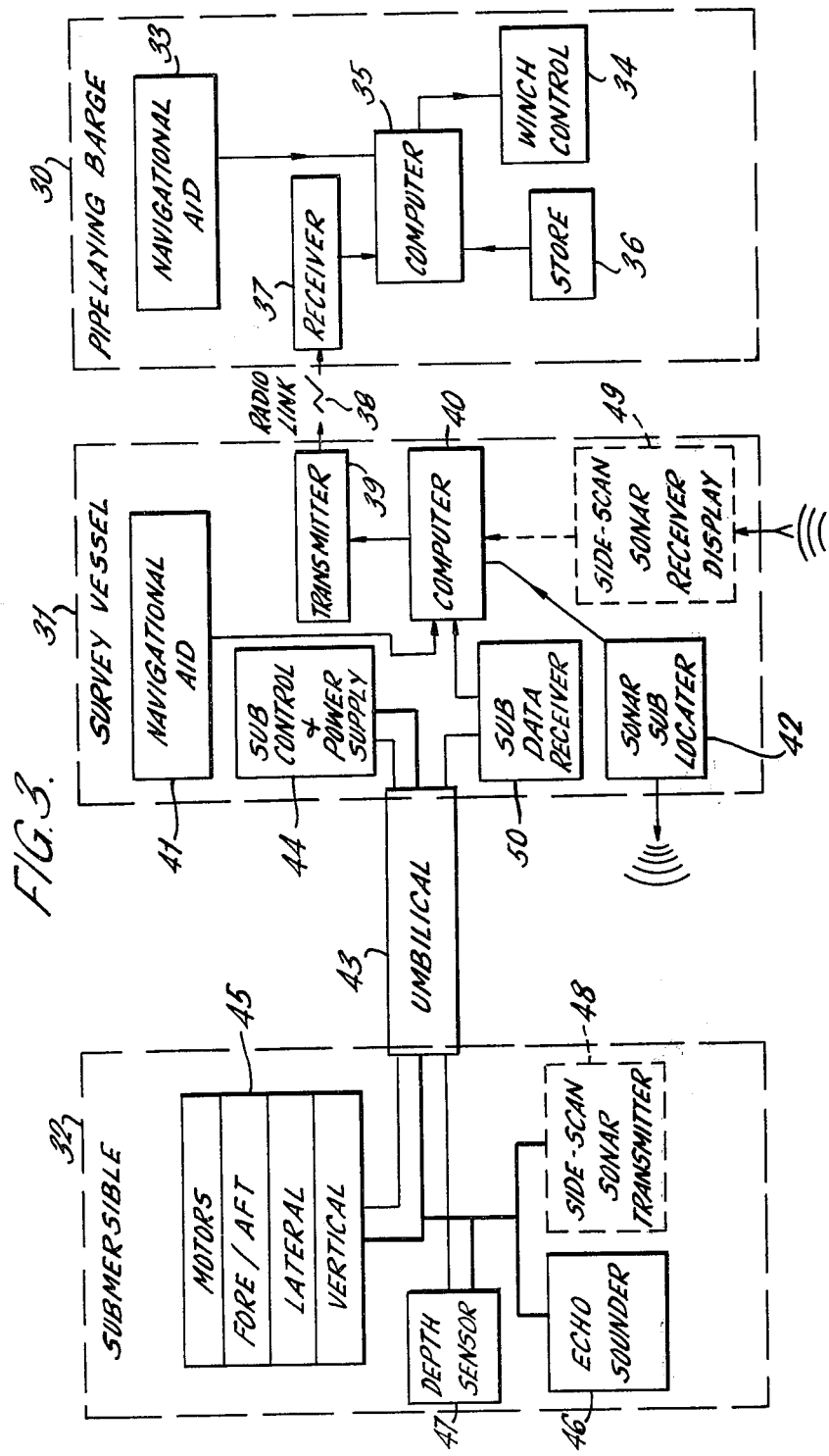

OFFSHORE PIPE LAYING

This invention relates to offshore pipe laying.

It is known to lay a pipeline on the sea bed by means of a pipe laying barge which has a stern ramp or a "stinger" for guiding and supporting the pipe as it bends downwardly from the barge towards the sea bed. In normal practice, the pipe laying barge is driven approximately along the desired predetermined track of the pipeline, which typically falls in a given "right of way". When the pipeline is being laid along a curved track, however, the touch down point, that is to say the locus of the point at which newly laid pipe touches the sea bed, will deviate from the desired predetermined track even if the pipe laying barge is driven at great precision along the track. Typically in a curved track, the touch down point will lie within the curvature of the desired track. Also, weather and marine currents may cause the touch down point to deviate from the desired track, even when laying pipe in a straight line.

In our co-pending Application No. 25172/76 a method of and system for offshore pipe laying is described and claimed which is operable to alleviate the above problem. As described in the specification of that co-pending application, the actual position of the pipe touch down point on the sea bed is ascertained using an echo sounder on a surface vessel, called for convenience a survey vessel. The survey vessel is provided with automatic pilot apparatus by which it may be navigated along a path over the sea bed with a very small deviation. The vessel is made to travel along and above the track of the pipe as already laid. With echo sounding equipment which is commercially available, echo returns from pipe lying on the sea bed and from the sea bed itself can be distinguished from each other, typically appearing as parallel traces on the echo sounder display. The position of the touch down point is identifiable when the upper trace representing the pipe, lifts away from the lower trace, representing the sea bed.

In the described pipe laying system, the position of the touch down point as located by the echo sounder is accurately defined by recording the position of the survey vessel when immediately above the identified touch down point. Commercially available navigational aids allow the position of the survey vessel to be defined with great accuracy. This touch down point position is sent by wireless to the pipe laying barge, where it is entered into a computer and compared with the desired predetermined track of the laid pipe which is contained in the computer store. Any deviation of the measured touch down point from the desired track is used to provide correction signals as input to a system controlling the forward movement of the barge. In the usual case, where the barge is located and moved by means of a plurality of anchors and cables, the system for controlling movement of the barge comprises a computer arranged to control the winches acting on the achor cables. The correction signal applied to the system for controlling movement of the barge causes the barge to be moved in such a way as to reduce any deviation of the measured touch down point from the desired predetermined track.

The system described in the co-pending application can operate quite satisfactorily in many conditions. However, one of the limiting factors to its effective operation is the depth of water in which the pipe is being laid. With the system of the co-pending application, it is essential that the echo sounder on the survey vessel can distinguish echo returns from the pipe when lying on the sea bed and from the bed itself. Typically, the resolution of echo sounding apparatus decreases with increasing range, and at great depths it may not be possible to distinguish the pipe returns from the sea bed returns as required. The depth at which this occurs depends not only on the capabilities of the echo sounding equipment, but also on the diameter of pipe being laid.

According to the present invention, a method of laying pipeline offshore comprises the steps of guiding a pipe laying barge along, or parallel with, a predetermined right of way, feeding a continuous length of pipe from the barge to the sea bed so that the pipe is laid in the right of way, driving, by control from a surface vessel, a remotely controlled submersible along the track of the pipe as laid, determining the position of the submersible relative to the surface vessel, ascertaining, by means of sonic location apparatus on the submersible, the position of the touch down point of the pipeline, computing lateral deviation of the touch down point from the desired predetermined track of laid pipe within the right of way, and controlling lateral displacement of the pipe laying barge in accordance with the computed deviation of the touch down point so as to reduce the aforementioned deviation.

According to another aspect of the invention, an offshore pipe laying system comprises a pipe laying barge having means for locating and propelling the barge and automatic control apparatus for controlling said locating and propelling means in accordance with input data; means for storing an indication of a desired predetermined track for a pipeline; a surface vessel; a remotely controlled submersible arranged to be controlled from the surface vessel; means for determining the position of the submersible relative to the surface vessel; sonic location apparatus on the submersible arranged for ascertaining, when the submersible is driven along the track of the pipe as laid, the position of the touch down point of the pipeline; automatic computing apparatus arranged for obtaining an indication of lateral deviation of the touch down point position, as ascertain by the sonic location apparatus, from the desired predetermined track of the pipeline and for computing in accordance with such lateral deviation input data for said automatic control apparatus of the pipe laying barge to reduce the aforementioned deviation.

It will be understood that normally the pipe laying barge includes a navigational aid which is capable of providing an accurate indication of the geographical co-ordinates of the pipe laying barge. The indication of the desired predetermined track for a pipe line may consist of a multiplicity of geographical co-ordinates along the desired track. The co-ordinates may be held in a computer store to be accessible for comparison with actual touch down point positions ascertained by the sonic location apparatus on the submersible. The surface vessel will normally also include a navigational aid by means of which the geographical co-ordinates of its position may accurately be found. Thus, the actual position of the touch down point may be computed accurately from the geographical co-ordinates of the surface vessel, provided by the navigational aid, combined with indications of the position of the submersible relative to the surface vessel as provided by said means for determining.

In one embodiment, the sonic location apparatus on the submersible comprises an echo sounder. A remote display for the echo sounder may be provided on the surface vessel. Then in operation, the submersible may be controlled by an operator on the surface vessel so that the submersible travels along immediately above the pipe laid on the sea bed, as indicated by the echo sounder display. The geographic co-ordinates of the submersible when the echo sounder display shows the pipe lifting from the sea bed then represent the co-ordinates of the touch down point.

It can be seen that by using an echo sounder on the submersible, the problems encountered at great depths with the method and system described in the co-pending Application No. 25172/76, can be overcome. The submersible can be driven along above the laid pipeline at relatively close range to the pipeline, so that the aforementioned problems of distinguishing echo returns from the pipe and the sea bed are obviated.

In another embodiment of the present invention, the sonic location apparatus on the submersible comprises a side scan sonar transmitter, and there is provided a complimentary receiver on the surface vessel. Various side-scan sonar equipments are known and commmercially available. As is known, side-scan sonar equipment can produce a photograph like display of the sea bed for a predetermined width on either side of the path travel of the transmitting equipment. Typically, the image comprises a shadow image produced by objects on the sea bed and bottom formations. When using a side-scan sonar transmitter on the submersible in the system of the present invention, the location of the laid pipe relative to the position of the submersible can be clearly visible from the sonar display on the surface vessel. In fact the pipe lying on the sea bed throws an acoustic shadow appearing as a straight line on the sonar display. The position of the touch down point can be determined using side-scan sonar. It will be appreciated that, since the image of the pipeline appearing on the sonar display is formed by the acoustic shadow of the pipe on the sea bed, when the pipe lifts off the sea bed the shadow will appear to veer away from the line of the pipe and away from the position of the submersible.

The use of side-scan on the submersible has two particular advantages. One advantage is that it is no longer essential to drive the submersible accurately above the laid pipe, since the position of the pipe relative to the submersible, in the horizontal plane, can be determined from the side-scan sonar display. However, a more important advantage arises when it is desired to lay a second pipeline parallel with and relatively close to a previously laid pipeline. The accuracy of the navigational aid equipment in the surface vessel and the pipe laying barge may not be sufficient to ensure that the second pipeline is laid at a desired distance alongside an existing previously laid line. However, with the side-scan sonar transmitter on the submersible, the position of both the previously laid line and the line being laid at the time can be displayed simultaneously on the sonar display. The distance of successive touch down points of the newly laid line from the previously laid line can be measured and deviations of this distance from the desired distance used to control the position of the pipe laying barge.

There follows a description of examples of the present invention in which reference is made to the accompanying drawings, of which:

FIG. 1 is a schematic illustration of a pipe laying barge, accompanying surface vessel and remotely controlled submersible;

FIG. 2 is a schematic illustration of a pipe laying operation in plan view;

FIG. 3 is a schematic illustration of apparatus which may be incorporated on the pipe laying barge, the survey vessel and the submersible.

Figure 4:
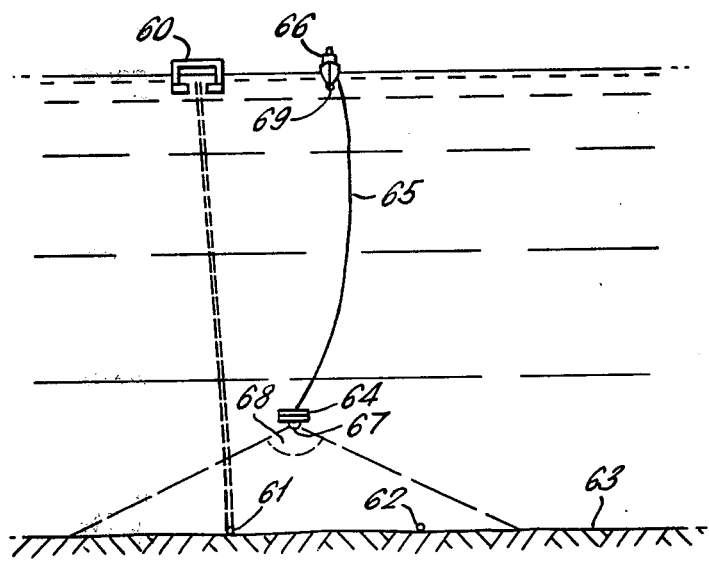
FIGS. 4 and 5 are schematic illustrations in elevation and plan respectively of a pipe laying operation employing a side-scan sonar transmitter on the submersible.

FIGS. 1 and 2 illustrate in schematic form a pipe laying operation. A pipe laying barge 1, which is preferably a semi-submersible barge, has a stern ramp 2 by means of which pipe 3 is supported and fed to the sea bed 4. In accordance with known practice, the semi-submersible barge may be located at any time by a plurality of anchors and is preferably moved so as to alter its geographical position by means of winches acting on the anchor cables. An automatic winch control system may be provided on the barge 1 by which the various winches are controlled simultaneously to move the barge as desired. FIGS. 1 and 2 show also a surface vessel 5, which may be termed for convenience a survey vessel. A remotely controlled submersible 6 is connected to the surface vessel 5 by means of an umbilical control and power cable 7. Remotely controlled and unmaned submersibles of the kind are known and commercially available. The submersible used for forming the present invention should be capable of navigating at the depths required and of carrying the necessary payload as will become apparent. As will be described later, the submersible 6 under control from the survey vessel 5 is operated to locate the touch down point 8 of the pipeline 3, that is to say the point at which the pipeline first touches the sea bed. For this purpose the submersible 6 carries sonic location apparatus 9 which is arranged to be capable of detecting the pipe laid on the sea bottom. The position of the submersible 6 relative to the survey vessel 5 is determined with the aid of a sonar apparatus 10 on the surface vessel 5.

As shown in FIG. 2, in the present example the pipeline is to be laid along a curved path 20 on the sea bed. The method and system of the present example are employed as will be described later to establish the geographical co-ordinates of the touch point of the pipe at successive intervals in time. Thus in FIG. 2, previous touch point positions A, B and C have been located, and the survey vessel 5 and submersible 6 are shown locating a further touch down point position 8 which is displaced from the desired pipe path 20 by a distance d. The co-ordinates of the position 8 relative to the touch down point as determined by the vessel 5 and submersible 6 are radioed to the pipe laying barge 1. The pipe laying barge 1 has a computer which compares the co-ordinates of position 8 with stored co-ordinates of the desired path 20 and provides instructions for a future movement of the barge 1 such as to reduce the distance d.

FIG. 3 shows in box schematic form the various systems and equipment on the three vessels of the pipe laying system, i.e., the pipe laying barge 30, the survey vessel 31 and the submersible 32. The pipe laying barge 30 has on board a navigational aid 33 which is arranged to provide accurate geographical co-ordinates of the position of the barge at any time. Such systems are known and are commercially available. There is also provided on the barge a winch control system 34 which is automated and arranged to control the various anchor cable winches simultaneously in accordance with input data, so as to move and locate the barge as desired. Although an anchor cable mooring system is described in the present example, the present invention can also be used with a barge fitted with a directional thruster system for station keeping and movement, in which case there is provided an automatic thruster control system. Further a hybrid system of anchors and thrusters may be employed.

The barge 30 also has a computer 35 and a store 36 in which there are stored the geographical co-ordinates of the desired predetermined track or path for the pipeline. In operation, the computer 35 receives from the survey vessel 31 data defining the geographical co-ordinates of the last located touch down point position, by means of a receiver 37. The computer 35 also receives data defining the geographical co-ordinates of the position of the barge from the navigational aid 33. From these input data the computer 35 computes deviation of the last located touch down point from the intended path for the pipeline and provides instructions as input to the winch control system 34 for the next barge movement to be such as to reduce the deviation.

The data defining the last located touch down point is transmitted to the pipe laying barge by a radio link 38 from a transmitter 39 on the survey vessel 31. On the survey vessel, there is provided a computer 40 which calculates the geographical co-ordinates of the last located touch down point position from various input data. This input data comprises the geographical co-ordinates of the survey vessel at the time of location of the touch down point, as provided by a navigational aid 41; and the position of the submersible relative to the survey vessel as provided by a sonar apparatus 42 on the survey vessel. Further, the survey vessel 31 carries submersible data receiving apparatus 50 which receives data transmitted from the submersible along an umbilical cable 43 connecting the submersible to the survey vessel. The vessel 31 also carries submersible control and power supply apparatus 44 which provide power and control signals to the submersible along the umbilical 43.

The power is used to drive the various control systems of the submersible 32 including motors 45 driving thrusters. In the example of FIG. 3, the submersible 32 has three motors, one for driving a (fore/aft) thruster by which the submersible may be driven forwards or backwards, one driving a lateral thruster by which the submersible may be driven to either side, and one connected to the vertical thruster by which the submersible may be driven up or down. Control signals for activating these three motors in accordance with instructions from the survey vessel 31 are also fed to the motors 45. As described above, the submersible 32 carries an echo sounder 46, which may be of a standard type commercially available. The echo sounder 46 is arranged to be capable of resolving echo return signals from the pipe resting on the sea bed from return signals from the sea bed itself. Electrical signals corresponding to the echo returns received by the echo sounder 46 are fed along the umbilical 43 for display at the data receiver 50 on the survey vessel. The submersible also carries a depth sensor 47 for generating a signal indicative of the depth of the submersible 32. These depth signals are also fed via the umbilical 43 to the survey vessel.

In a typical operating mode, in the example with the echo sounder 46 on the submersible, the submersible is driven, by control from the survey vessel 31, to track along and immediately over the pipe as laid on the bed. It is only necessary for the survey vessel 31 to be positioned sufficiently close to the laid pipeline for the umbilical 43 to reach. As the submersible is driven along and above the laid pipeline, the echo response signals received by the echo sounder 46 and displayed on the survey vessel are viewed and the trace corresponding to the pipe can be clearly distinguished from the trace corresponding to the sea bed. For this purpose it is important that the submersible 32 be driven at a sufficient depth so as to be close enough to resolve the pipeline from the sea bed. The actual depth of water where the pipe is being laid is then immaterial provided that the submersible operates at the depth required and the umbilical 43 is sufficiently long.

When the submersible passes above the touch down point of the pipe, this can be recognized on the echo sounder display on the survey vessel by divergence of the pipe trace from the sea bed trace. During the complete operation, the position of the submersible relative to the survey vessel is monitored and recorded by the sub-locator 42. Locator 42 may comprise any commercially available sonar system capable of providing the range, and azimuth and depression angle of the submersible relative to the vessel. Further, the depth signals from depth sensor 47 may be used in combination with the output of the locator 42 more accurately to define the position of the submersible relative to the survey vessel. The time when the submersible 32 passes over the touch down point, as identified by the echo sounder display, is fed into the computer 40. The computer then selects the georgraphical co-ordinates of the survey vessel 31, provided by the navigational aid 41 at this time, and also the co-ordinates of the position of the submersible at the same time as defined by the sonar locator 42. From this date, it is a simple matter for the computer to calculate the geographical co-ordinates of the touch down point which are then transmitted by the transmitter 39 to the pipe laying barge.

Figure 5:
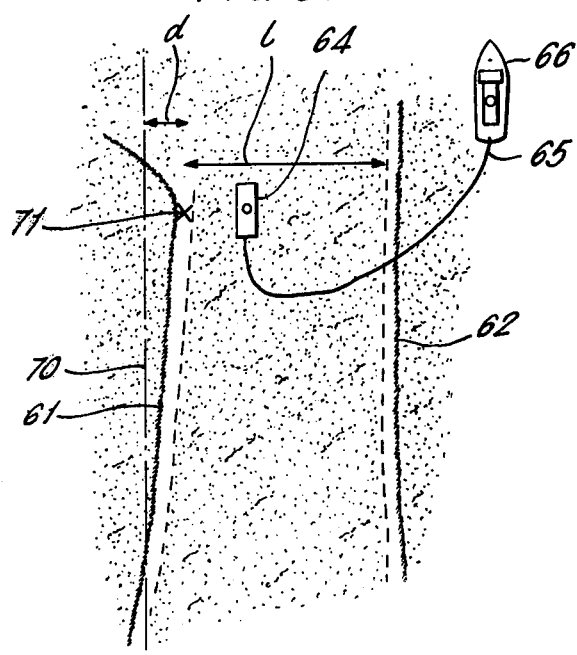

FIGS. 4 and 5 illustrate a second example of the present invention, in which the side-scan sonar transmitter is provided on the submersible instead of an echo sounder. A pipe laying barge 60 is shown laying a pipe 61 on the sea bed 63. A remotely controlled submersible 64 is connected by an umbilical cable 65 to a surface survey vessel 66. The submersible 64 carries a side-scan sonar transmitter 67. Side-scan sonar systems are well known and commercially available and typically operate to emit a beam of acoustic energy which is scanned from side to side across the sea bed, for example, over an angle 68 as shown in FIG. 4. Echo returns from the side-scan sonar transmitter are received by a receiver 69 on the surface survey vessel 66. As is known, a side-scan sonar system can be used to locate objects on the sea bed. Objects on the bed throw a shadow of the acoustic energy transmitted, and the reflected acoustic energy can be received by the receiver 69 on the survey vessel 66 and an image of the sea bed produced showing the positions of the shadows.

Using a side-scan sonar transmitter on the submersible is especially useful when it is desired to lay a second pipeline alongside and relatively close to an existing previously laid line. For example, as shown in FIGS. 4 and 5 it may be desired to lay the new line 61 alongside and parallel to the previously laid line 62. It will be understood that, with the previously described system employing an echo sounder on the submersible, the accuracy with which the touch down point positions of the line being laid can be measured depends, inter alia, on the precision of the navigational aid on the surface survey vessel. This precision may not be sufficient to position a second pipeline at a desired, relatively close, distance alongside a previously laid line. However, a side-scan sonar transmitter mounted on the submersible has the great advantage that both the new line being laid and the existing line can be viewed simultaneously on the side-scan sonar display. Thus, instead of controlling the pipe laying barge to lay the pipe as close as possible to a predetermined set of geographical co-ordinates defining the desired track of the pipe, the side-scan sonar enables the barge to be controlled to lay the pipe at a predetermined distance from an existing line.

FIG. 5 illustrates a typical side-scan sonar display during an exemplary pipe laying operation. Since it is the shadow thrown by objects on the sea bed which primarily constitute the image on the side-scan sonar display, the submersible 64 is not driven so as to be immediately above the pipeline 61 just laid on the sea bed. In FIG. 5 the submersible 64 is shown being driven along between the line of a newly laid pipe 61 and the existing previously laid line 62. However, the submersible may be driven to one side of both the new and existing lines. In each case, the position of the touch down point on the newly laid line can be determined relative to the submersible 64. Thus, where the new line is being laid along a predetermined track defined by stored geographical co-ordinates, the geographical co-ordinates of successive touch down points can be determined.

The position of the touch down point is determined in a different way using side-scan sonar compared with using an ordinary echo sounder. As the pipe lifts off the sea bed from the touch down point the shadow thrown on the sea bed by the pipe, which can be seen on the side-scan sonar display, appears to veer away from the line of pipe laid so far and away from the position of the submersible. Thus, as shown on FIG. 5 the position 71 of the touch down point of the newly laid pipeline 61 is at the point where the shadow image of the pipe veers away to the left.

When laying pipe alongside an existing line, the distance 1 of the most recently identified touch down point 71 from the previously laid pipeline 62 is measured from the side-scan sonar display screen. This distance may be radioed to the pipe laying barge, where it is entered into the computer 35 (FIG. 3). In computer 35 the distance 1 is compared with the desired separation of the newly laid line from the existing line and any deviation d from the desired track 70 of the newly laid is calculated. This deviation is employed to provide input data for the winch control system 34 so that the barge is subsequently moved in such a way as to reduce the deviation d.

I claim:

1. A method of laying pipeline offshore comprising the steps of guiding a pipe laying barge along, or parallel with, a predetermined right of way, feeding a continuous length of pipe from the barge to the sea bed so that the pipe is laid in the right of way, driving, by control from a surface vessel, a remotely controlled submersible along the track of the pipe as laid, determining the position of the submersible relative to the surface vessel, ascertaining, by means of sonic location apparatus on the submersible, the position of the touch down point of the pipeline, computing lateral deviation of the touch down point from the desired predetermined track of laid pipe within the right of way, and controlling lateral displacement of the pipe laying barge in accordance with the computed deviation of the touch down point so as to reduce the aforementioned deviation.

2. A method as claimed in claim 1 wherein the sonic location apparatus on the submersible is an echo sounder and the position of the touch down point is ascertained by driving the submersible immediately above the pipe laid on the sea bed and noting the position of the submersible when the echo sounder indicates the pipe just lifting from the sea bed.

3. A method as claimed in claim 1 wherein the sonic location apparatus on the submersible is a side scan sonar transmitter and there is a complementary receiver on the surface vessel, and the position of the touch down point is ascertained by driving the submersible above and to one side of the pipe laid on the sea bed ascertaining with the side scan sonar apparatus the position relative to the submersible of the point where the pipe just lifts off the sea bed and simultaneously noting the position of the submersible.

4. A method as claimed in claim 1 wherein the desired predetermined track of the laid pipe is stored as a multiplicity of geographical coordinates along the desired track and the lateral deviation of the touch down point is computed by ascertaining the geographical position of the touch down point and comparing this with said stored co-ordinates.

5. A method as claimed in claim 3 wherein the desired predetermined track for the pipe being laid is substantially parallel with and a predetermined distance from a previously laid pipeline, and the submersible is driven along so that the side scan sonar apparatus detects simultaneously both the pipeline being laid and the previously laid line, and the duration of the touch down point is computed by comparing the lateral distance of the touch down point from the previously laid pipeline with the desired predetermined distance.

6. An offshore pipe laying system comprising a pipe laying barge having means for locating and propelling the barge; said barge also having means for feeding a continuous length of pipe from the barge to the seabed; automatic control apparatus for controlling said locating and propelling means in accordance with input data; storage means for storing an indication of a desired predetermined track on said seabed for a pipe line being laid by said barge; a surface vessel; a remotely controllable submersible; means on said surface vessel for controlling said submersible from said surface vessel; means for determining the position of the submersible relative to the surface vessel; said controlling means on said surface vessel including means driving said submersible along the track of the pipe laid by said pipe laying barge; sonic location apparatus on the submersible for ascertaining the position of the seabed touch-down point of the pipe line laid by said pipe laying barge; automatic computing apparatus arranged for obtaining an indication of lateral deviation of said touch-down point position, as ascertained by said sonic location apparatus, from the desired predetermined track of the pipe line stored in said storage means, and for computing in accordance with such lateral deviation input data for said automatic control apparatus of the pipe laying barge to reduce the aforementioned deviation.

7. A system as claimed in claim 6 wherein the sonic location apparatus on the submersible is an echo sounder capable of distinguishing between the pipe lying on the seabed and the seabed as said submersible is driven along the track of said pipe laid by said pipe laying barge.

8. A system as claimed in claim 7 wherein the sonic location apparatus on the submersible is a side scan sonar transmitter and there is a complimentary receiver on the surface vessel, the side scan sonar apparatus being capable of distinguishing between the pipe lying on the seabed and the seabed when driven along, above and to one side of said pipe line.

9. A system as claimed in claim 8 wherein the means for determining the position of the submersible relative to the surface vessel is a sonar apparatus on the surface vessel.

10. An offshore pipe laying system comprising a pipe laying barge having means for locating and propelling the barge and automatic control apparatus for controlling said locating and propelling means in accordance with input data; means for storing an indication of a desired predetermined track for a pipe line; a surface vessel; a remotely controllable submersible arranged to be controlled from the surface vessel; means for determining the position of the submersible relative to the surface vessel; sonic location apparatus on the submersible arranged for ascertaining, when the submersible is driven along the track of the pipe as laid, the position of the seabed touch-down point of the pipe line; automatic computing apparatus arranged for obtaining an indication of lateral deviation of said touch-down position, as ascertained by the sonic location apparatus, from the predetermined track of the pipe line and for computing in accordance with such lateral deviation input data for said automatic control apparatus of the pipe laying barge to reduce the aforementioned deviation; the sonic location apparatus on the submersible being a side scan sonar transmitter; and a complimentary receiver on the surface vessel, the side scan sonar apparatus being capable of resolving the pipe lying on the seabed when driven along above and to one side of it.

* * * * *

UNITED STATES PATENT OFFICE
CERTIFICATE OF CORRECTION

Patent No. 4,164,379      Dated August 14, 1979

Inventor(s) Lee R. Denman

It is certified that error appears in the above-identified patent and that said Letters Patent are hereby corrected as shown below:

Column 1, line 58, change "achor" to - -anchor- -.

Column 2, line 44, change "ascertain" to - -ascertained - -

Column 3, line 25, change "equipm-" to - -equip- -.

Column 6, line 33, change "georgraphical" to - -geographical- -.

Column 7, lines 45 and 50, "distance 1" should be - -distance C- -.

Claim 4, column 8, line 25, change "coordinates" to - -co-ordinates- -.

Claim 10, Column 10, line 9, insert "point" after "touch-down".

Signed and Sealed this

Twenty-sixth Day of February 1980

[SEAL]

Attest:

SIDNEY A. DIAMOND

*Attesting Officer*     *Commissioner of Patents and Trademarks*